(12) United States Patent
Kuehn et al.

(10) Patent No.: US 11,453,141 B2
(45) Date of Patent: Sep. 27, 2022

(54) CUTTING LENGTH DISPLAY DEVICE

(71) Applicant: Robert Bosch GmbH, Stuttgart (DE)

(72) Inventors: Thorsten Kuehn, Stuttgart (DE);
Thomas Ziegler, Steinheim An der Murr (DE); Michael Wall, Stuttgart (DE); Joerg Maute, Sindelfingen (DE)

(73) Assignee: Robert Bosch GmbH, Stuttgart (DE)

( * ) Notice: Subject to any disclaimer, the term of this patent is extended or adjusted under 35 U.S.C. 154(b) by 93 days.

(21) Appl. No.: 15/764,767

(22) PCT Filed: Oct. 24, 2016

(86) PCT No.: PCT/EP2016/075486
§ 371 (c)(1),
(2) Date: Mar. 29, 2018

(87) PCT Pub. No.: WO2017/076671
PCT Pub. Date: May 11, 2017

(65) Prior Publication Data
US 2018/0272553 A1     Sep. 27, 2018

(30) Foreign Application Priority Data

Nov. 4, 2015    (DE) ................ DE10 2015 221 637.3

(51) Int. Cl.
*B27B 9/02*     (2006.01)
*B23D 59/00*    (2006.01)

(52) U.S. Cl.
CPC .............. *B27B 9/02* (2013.01); *B23D 59/002* (2013.01); *B23D 59/003* (2013.01)

(58) Field of Classification Search
CPC ...... B23D 59/002; B23D 59/003; B27B 9/02; B25H 1/0092; Y10T 408/21; B26D 7/08; B26D 5/08
See application file for complete search history.

(56) References Cited

U.S. PATENT DOCUMENTS 3,953,034 A * 4/1976 Nelson ............... A63B 69/3614
                                              473/220
4,006,343 A * 2/1977 Izura .................. G06K 7/10871
                                              235/470
(Continued)

FOREIGN PATENT DOCUMENTS

CN        1532031 A      9/2004
CN        2853250 Y      1/2007
(Continued)

OTHER PUBLICATIONS

International Search Report corresponding to PCT Application No. PCT/EP2016/075486, dated Jan. 12, 2017 (German and English language document) (5 pages).

*Primary Examiner* — Evan H MacFarlane
*Assistant Examiner* — Fernando A Ayala
(74) *Attorney, Agent, or Firm* — Maginot, Moore & Beck LLP

(57) ABSTRACT

A cutting length display device for a hand-held machine tool includes at least one display unit that has at least one light source. The display unit is configured to display at least one position of a cutting edge of a machine tool on a workpiece to be machined depending on a set cutting depth of the machine tool by way of a light beam. The display unit has a mirror unit that is configured to deflect the light beam depending on the set cutting depth of the machining tool.

19 Claims, 6 Drawing Sheets

(56) References Cited

U.S. PATENT DOCUMENTS

| | | | | |
|---|---|---|---|---|
| 4,009,723 | A * | 3/1977 | Stungis | A24C 5/28 131/84.1 |
| 4,190,890 | A * | 2/1980 | Marx | H01B 13/01227 29/720 |
| 4,968,146 | A * | 11/1990 | Heizmann | B25F 5/003 356/3.08 |
| 5,375,495 | A * | 12/1994 | Bosten | B23D 33/12 30/388 |
| 5,667,345 | A * | 9/1997 | Wiklund | B23D 59/002 408/1 R |
| 6,497,168 | B1 * | 12/2002 | Levine | B23D 59/003 30/390 |
| 6,651,591 | B1 * | 11/2003 | Chelen | A01K 15/025 119/707 |
| 6,937,336 | B2 * | 8/2005 | Garcia | B23B 49/00 33/286 |
| 7,493,700 | B2 * | 2/2009 | Isele | B23D 59/002 30/123 |
| 7,926,398 | B2 * | 4/2011 | Garcia | B23D 59/003 362/89 |
| 8,475,507 | B2 * | 7/2013 | Dewey | A61N 5/0616 607/89 |
| 9,925,684 | B2 * | 3/2018 | Sinzig | B23Q 17/22 |
| 2005/0052720 | A1 * | 3/2005 | Tetterington | G02B 26/12 359/217.1 |
| 2006/0033804 | A1 * | 2/2006 | Dan | G02B 26/121 347/230 |
| 2006/0081101 | A1 * | 4/2006 | Hayashi | C03B 33/093 83/15 |
| 2007/0053038 | A1 * | 3/2007 | Keithley | G02B 26/125 359/212.2 |
| 2007/0065195 | A1 * | 3/2007 | Bateman, III | G03G 21/0035 399/349 |
| 2009/0196697 | A1 * | 8/2009 | Kuo | B23C 3/00 408/16 |
| 2009/0260239 | A1 * | 10/2009 | Cerwin | G01C 15/002 33/286 |
| 2014/0130643 | A1 * | 5/2014 | Dammertz | B27G 19/02 83/13 |
| 2014/0165736 | A1 * | 6/2014 | Paul | G01M 11/081 73/760 |
| 2016/0103324 | A1 * | 4/2016 | Arakawa | H04N 3/30 345/690 |
| 2017/0315446 | A1 * | 11/2017 | Ueda | H05G 2/008 |

FOREIGN PATENT DOCUMENTS

| | | |
|---|---|---|
| CN | 201058385 Y | 5/2008 |
| CN | 202074897 U | 12/2011 |
| CN | 103357956 A | 10/2013 |
| DE | 10 2012 219 397 A1 | 1/2014 |

* cited by examiner

CUTTING LENGTH DISPLAY DEVICE

This application is a 35 U.S.C. § 371 National Stage Application of PCT/EP2016/075486, filed on Oct. 24, 2016, which claims the benefit of priority to Serial No. DE 10 2015 221 637.3, filed on Nov. 4, 2015 in Germany, the disclosures of which are incorporated herein by reference in their entirety.

BACKGROUND

DE 10 2012 219 397 A1 has already disclosed a cutting length display apparatus for a power tool, which has a display unit, comprising a movably mounted display element, for displaying at least one position of a cutting edge of a machining tool on a workpiece to be machined in dependence on a set cutting depth of the machining tool.

SUMMARY

The disclosure proceeds from a cutting length display apparatus for an in particular portable power tool, having at least one display unit which has at least one light source and is provided to display, using a light beam, at least one position of a cutting edge of a machining tool on a workpiece to be machined in dependence on a set cutting depth of the machining tool.

What is proposed is that the display unit has a mirror unit that is provided to deflect the light beam in dependence on the set cutting depth of the machining tool.

For displaying the position of the cutting edge, the display unit is provided in particular in at least one operating state to display a cutting edge mark, for example a cutting edge display line extending at least substantially transversely to a cutting plane of the machining tool, on a workpiece to be machined using the light beam from the light source. The light source is preferably configured as a laser light source, with particular preference as a laser diode. Cutting edges of cutting teeth of the machining tool preferably extend at least substantially transversely to the cutting plane of the machining tool. "At least substantially transversely" is here understood to mean in particular an orientation of a plane and/or a direction relative to a further plane and/or a further direction, which preferably deviates from a parallel orientation of the plane and/or of the direction relative to the further plane and/or the further direction. The machining tool is configured preferably in the form of a circular saw blade. Consequently, the machining tool performs a rotating movement for providing a cut in the workpiece preferably in the cutting plane of the machining tool. The cutting plane extends preferably at least substantially transversely to a workpiece surface of the workpiece to be machined for providing a cut in the workpiece.

A cutting edge display line imaged on the workpiece by the display unit in at least one operating state has in particular a maximum length that is in particular longer than 2 mm, preferably longer than 5 mm, and with particular preference longer than 10 mm. The cutting edge display line imaged on the workpiece by the display unit in at least one operating state is formed by a transverse extent, in particular a diameter, of the light beam of the light source. The cutting edge display line preferably shows at least one exit point or entry point of the machining tool, in particular of cutting edges of the machining tool, from or into a workpiece to be machined on a workpiece surface of the workpiece, at which the machining tool, upon reaching a set cutting depth of the machining tool during machining of the workpiece, would exit from the workpiece or would enter the workpiece, or exits from the workpiece or enters the workpiece, in particular in a manner decoupled from a displacement movement of the portable power tool on the workpiece surface of the workpiece. The display unit images the cutting edge display line preferably at least substantially transversely, in particular at least substantially perpendicularly, with respect to the cutting plane of the machining tool on the workpiece.

A "mirror unit" in this context is understood to mean in particular a unit which in at least one operating state is arranged at least partially in a beam path of the light beam from the light source and is provided for reflecting the light beam so as to display a position of a cutting edge at least partially on the workpiece to be machined. The mirror unit in particular has at least one mirror element that is provided to completely and/or at least partially reflect the incident light beam, preferably at a reflection angle that corresponds to an angle of incidence. An angle of incidence of the light beam is changeable in particular in dependence on a set cutting depth of the machining tool.

With a configuration of this type, a cutting length display apparatus can be provided that makes advantageous display of a cutting edge display line possible. It is furthermore possible due to the cutting length display apparatus to be performed advantageously in a compact, robust, flexible and/or cost-effective manner using a mirror unit.

Furthermore proposed is that a relative pose of at least one part of the mirror unit with respect to the light source is changeable for changing at least one reflection angle. A "relative pose" is understood to mean in particular a relative, in particular spatial, position and/or a relative, in particular spatial, orientation. In particular the light source and/or a part of the mirror unit, in particular at least a mirror element of the mirror unit, of the display unit are mounted so as to be in particular translationally and/or rotationally movable. The relative pose of at least one part of the mirror unit with respect to the light source is changeable in particular in dependence on a set cutting depth of the machining tool. By changing the relative pose of at least one part of the mirror unit with respect to the light source, an angle of incidence of the light beam from the light source on a mirror element of the mirror unit is in particular changeable. As a result, an advantageously simple and/or precise display of a position of a cutting edge of a machining tool in dependence on a set cutting depth of the machining tool can be effected.

It is furthermore proposed that the mirror unit has at least one concave mirror element provided to deflect the light beam onto the workpiece. A "concave mirror element" in this context is understood to mean in particular a mirror element which has a mirror surface that has an at least substantially aspheric, spherical, hyperbolic or parabolic curvature. In particular, the light beam from the light source is projected directly or indirectly onto a mirror surface of the concave mirror element. The light source is mounted in particular translationally displaceable relative to the concave mirror element for changing a reflection angle. A curvature of the concave mirror element is adapted in particular to a movement profile, which is determined by a geometry of the machining tool, of the cutting edges of the machining tool in the case of a change in the cutting depth of the machining tool. As a result, an advantageously exact display of a position of a cutting edge of a machining tool can be achieved.

It is additionally proposed that the mirror unit has at least one concave mirror element and at least one deflecting mirror element, which is provided to deflect the light beam onto the concave mirror element. The deflecting mirror element in particular has an at least substantially planar mirror surface. The deflecting mirror element is in particular provided for deflecting the light beam from the light source between the light source and the concave mirror element by at least substantially 90°. Consequently, an advantageously flexible arrangement of the light source can be made possible.

It is furthermore proposed that the deflecting mirror element is displaceable relative to the concave mirror element for changing at least one reflection angle. In particular, the deflecting mirror element is displaceable in a direction which corresponds at least substantially to an emission direction of a light beam from the light source. Due to this, it is possible for the light source to be arranged advantageously at a fixed position, as a result of which in particular a cable run can be realized in a particularly simple manner.

Also proposed is that the mirror unit has at least one mirror element that is mounted so as to be rotatable about an axis of rotation and is provided for deflecting the light beam onto the workpiece. In particular, the light source is provided for projecting the light beam directly onto a mirror surface of the mirror element. The mirror element is in particular rotatable about the axis of rotation in dependence on the set cutting depth of the machining tool. In a preferred configuration of the disclosure, it is proposed that the mirror element has, at an outer contour, at least one convexly curved mirror surface. The outer contour of the mirror element in particular has an at least substantially oval form. A curvature of the outer contour is adapted in particular to a movement profile, determined by a geometry of the machining tool, of the cutting edges of the machining tool in the case of a change of the cutting depth of the machining tool. In a further preferred configuration of the disclosure, it is proposed that the mirror element has a plurality of planar mirror surfaces, which are arranged at the mirror element in the circumferential direction. The mirror element in particular has an at least substantially circular or annular main body. The planar mirror surfaces are arranged at an outer circumference of the main body. An arrangement of the planar mirror surfaces at the main body is adapted in particular to a movement profile, determined by a geometry of the machining tool, of the cutting edges of the machining tool in the case of a change of the cutting depth of the machining tool. As a result, an advantageously simple and/or precise deflection of the light beam in dependence on the set cutting depth of the machining tool can be effected.

It is furthermore proposed that the mirror unit has at least one cable system, which is provided for initiating a rotational movement of the mirror element in dependence on the set cutting depth of the machining tool. A "cable system" in this context is understood to mean in particular a unit which has at least one cable provided for transferring at least one force. In particular, the cable unit has at least one pull cable. A "pull cable" is understood to mean in particular a cable which is provided for influencing at least one in particular mechanical process by way of a traction movement. A "cable" is understood to mean in particular a long, flexible element. In particular, the cable can consist of a plurality of in particular twisted natural fibers, synthetic fibers and/or wires or be formed by a single fiber or a single wire. In addition to at least one cable, the cable system can in particular comprise further elements, for example fixed and/or movable pulleys, or further cables. It is hereby possible for a deflection of the light beam to be effected advantageously easily in dependence on the set cutting depth of the machining tool.

Furthermore proposed is a power tool, in particular a portable power tool, in particular a circular saw, having at least one cutting length display apparatus according to the disclosure. A "portable power tool" is here understood to mean in particular a power tool, in particular a hand-held power tool, which can be transported by a user without a transport machine. The portable power tool has in particular a mass of less than 40 kg, preferably less than 10 kg and particularly preferably less than 5 kg. With particular preference, the portable power tool is configured as a plunge saw. However, it is also feasible for the power tool to have a different configuration which appears sensible to a person skilled in the art. The power tool preferably has a cutting depth setting unit, which is provided for setting a cutting depth of the machining tool which is capable of being coupled to a tool holder of the portable power tool. The expression "cutting depth setting unit" is here understood to define in particular a unit which is provided for limiting a plunging distance of the machining tool connected to the tool holder of the portable power tool, in particular of a circular saw blade, into a workpiece to be machined and/or for setting a length of a plunging distance of the machining tool into the workpiece to be machined. The plunging distance of the machining tool into the workpiece to be machined is here in particular viewed in a direction that extends at least substantially perpendicularly to a placement surface of a placement unit of the portable power tool, by way of which the portable power tool is placed on a workpiece surface of a workpiece to be machined. The expression "substantially perpendicular" is here in particular understood to define an orientation of a direction relative to a reference direction, wherein the direction and the reference direction, in particular viewed in a plane, enclose an angle of 90°, and the angle has a maximum deviation of in particular less than 8°, advantageously less than 5° and with particular advantage less than 2°. It is hereby possible to achieve advantageously precise machining of a workpiece using the portable power tool.

It is furthermore proposed that the cutting length display apparatus comprises at least the movement coupling unit which is provided for moving at least the light source and/or at least a mirror element in dependence on a movement of a cutting depth setting element of the cutting depth setting unit. The cutting depth setting element is configured particularly preferably as a depth stop, which delimits a plunging distance of the machining tool connected to a workpiece holder of the portable power tool, in particular of a circular saw blade, into the workpiece to be machined and/or by way of which a length of the plunging distance is settable. It is hereby possible to advantageously achieve coupling of the light source and/or of a mirror element to the cutting depth setting element. Consequently, a setting of a position of the light source and/or of a mirror element that is dependent on a position of the cutting depth setting element can advantageously be achieved. It is hereby possible to advantageously achieve a precise display of a cutting length of the machining tool in dependence on a set cutting depth of the machining tool.

The cutting length display apparatus according to the disclosure and/or the power tool according to the disclosure is/are here not intended to be limited to the above-described application and embodiment. In particular, the cutting length display apparatus according to the disclosure and/or the power tool according to the disclosure can have a number of individual elements, components and units that deviate from those mentioned here for fulfilling a function that is described here.

BRIEF DESCRIPTION OF THE DRAWINGS

Further advantages can be gathered from the following description of the drawings. In the drawings, exemplary embodiments of the disclosure are illustrated. The drawings, the description and the claims contain numerous features in combination. Expediently, a person skilled in the art will also consider the features individually and combine them to form meaningful further combinations.

In the figures.

DETAILED DESCRIPTION

Figure 1:
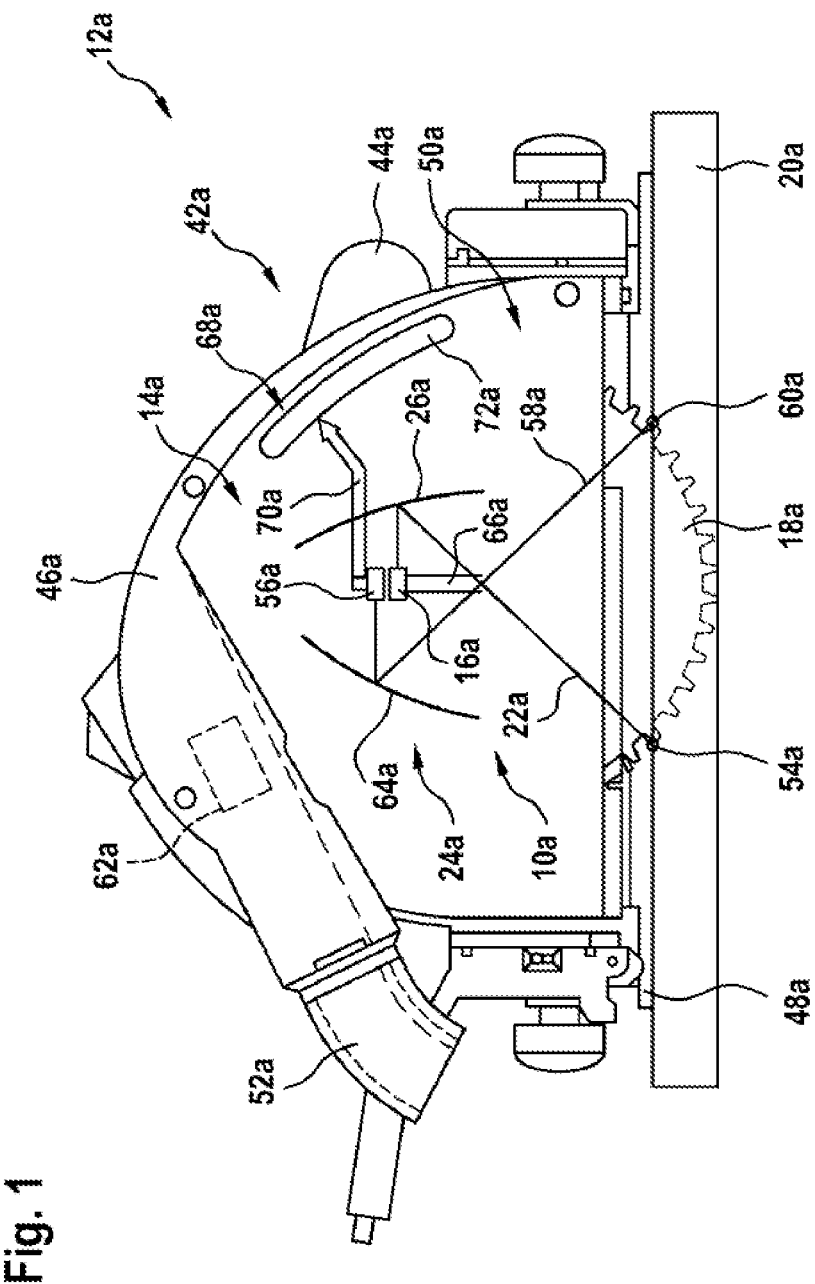
FIG. 1 shows a simplified illustration of a portable power tool having a cutting length display apparatus.

FIG. 1 shows a simplified illustration of a portable power tool 12a which is configured as a circular saw, in particular a plunge saw. The portable power tool 12a, which is configured as a plunge saw, comprises a cutting depth setting unit 42a for setting a cutting depth of a machining tool 18a and at least one cutting length display apparatus 10a. It is possible by setting a position of a cutting depth setting element 44a to set a cutting depth of the machining tool 18a in a manner that is already known to a person skilled in the art. The machining tool 18a is connected to a workpiece holder (not illustrated in more detail here) of the portable power tool 12a. The portable power tool 12a furthermore comprises a power tool housing 46a, which is provided for enclosing a drive unit (not illustrated) of the portable power tool 12a. The drive unit comprises a drive shaft, which is provided for driving the machining tool 18a, which is capable of being coupled to the workpiece holder, in a manner that is already known to a person skilled in the art.

The portable power tool 12a furthermore comprises a placement unit 48a, which is configured as a base plate or as a slide shoe, by way of which the portable power tool 12a is placed on a workpiece surface of a workpiece 20a during machining of the workpiece 20a or glides on the workpiece surface during a movement for making a cut in the workpiece 20a. Additionally arranged on the placement unit 48a is a protection unit 50a of the portable power tool 12a, which is provided for protecting a user against injury when machining the workpiece 20a. The protection unit 50a is here configured as a protective hood that encloses the machining tool 18a in an installed state in a direction of rotation of the drive shaft by more than 160°. The protection unit 50a furthermore has a suction coupling element 52a, which is connectable to a suction unit (not illustrated in more detail here) for sucking up removed workpiece particles during machining of the workpiece 20a.

The cutting length display apparatus 10a for the portable power tool 12a has a display unit 14a, which comprises a light source 16a and is provided for displaying at least one position of a cutting edge of the machining tool 18a on a workpiece 20a to be machined in dependence on a set cutting depth of the machining tool 18a using a light beam 22a. The display unit 14a furthermore has a further light source 56a. The display unit 14a is provided in at least one operating state for displaying at least one position of a further cutting edge of the machining tool 18a using a further light beam 58a. The display unit 14a is configured as a laser display unit. The light source 16a and the further light source 56a are configured as laser light sources. The display unit 14a images in at least one operating state a cutting edge display line 54a, which extends at least substantially transversely to a cutting plane of the machining tool 18a, on the workpiece 20a to be machined using the light beam 22a for displaying the position of the cutting edge. The display unit 14a images in at least one operating state a further cutting edge display line 60a, which extends at least substantially transversely to the cutting plane of the machining tool 18a, on the workpiece 20a to be machined using the further light beam 58a for displaying the position of the further cutting edge. The light source 16a and the further light source 56a are supplied with energy for producing the light beams 22a, 58a by an energy unit 62a of the cutting length display apparatus 10a or the portable power tool 12a. To this end, the energy unit 62a can be formed by a separate battery pack, or the energy unit 62a is electrically connected electrically to an energy supply unit (not illustrated in more detail here) of the portable power tool 12a.

The cutting edge display line 54a, which is imaged on the workpiece 20a using the light beam 22a, is provided for displaying a position of a rear cutting edge of the machining tool 18a on the workpiece 20a to be machined, as viewed in a direction that extends counter to a movement direction of the portable power tool 12a for making a cut in the workpiece 20a. The rear cutting edge of the machining tool 18a corresponds to a rear exit edge of cutting edges of the machining tool 18a from the workpiece 20a to be machined when a cutting depth of the machining tool 18a that is set using the cutting depth setting unit 42a has been reached. The further cutting edge display line 60a is provided for displaying a position of a front cutting edge of the machining tool 18a on the workpiece 20a to be machined, as viewed in the direction that extends counter to the movement direction of the portable power tool 12a for making a cut in the workpiece 20a. The front cutting edge of the machining tool 18a corresponds to a front entry edge of cutting edges of the machining tool 18a in the workpiece 20a to be machined when a cutting depth of the machining tool 18a that is set using the cutting depth setting unit 42a has been reached.

The display unit 14a has a mirror unit 24a, which is provided for deflecting the light beams 22a, 58a in dependence on the set cutting depth of the machining tool 18a. A relative pose of at least one part of the mirror unit 24a with respect to the light sources 16a, 56a is changeable for changing a reflection angle. The mirror unit 24a has two concave mirror elements 26a, 64a, which are provided for deflecting the light beams 22a, 58a onto the workpiece 20a. The light sources 16a, 56a are displaceable along a guide track 66a, extending perpendicularly to the placement unit 48a, relative to the concave mirror elements 26a, 64a.

The cutting length display apparatus 10a furthermore comprises a movement coupling unit 68a, which connects the light sources 16a, 56a of the display unit 14a to the cutting depth setting element 44a of the cutting depth setting unit 42a in a movement-dependent manner. The light sources 16a, 56a are connected to a movement coupling element 70a of the movement coupling unit 68a. The cutting depth setting element 44a is mounted movably on a guide track element 72a of the cutting depth setting unit 42a for setting a cutting depth of the machining tool 18a. The guide track element 72a is arranged at the protection unit 50a. In the case of a movement of the cutting depth setting element 44a relative to the guide track element 72a, the movement coupling element 70a is likewise moved, due to the connection to the cutting depth setting element 44a, relative to the guide track element 72a along a profile of the guide track element 72a, as a result of which the light sources 16a, 56a are displaced along the guide track 66a. The displacement of the light sources 16a, 56a relative to the concave mirror elements 26a, 64a results in a change in the reflection angle of the light beams 22a, 58a in the direction of the workpiece 20a.

FIGS. 2 to 6 illustrate five alternative exemplary embodiments. Components, features and functions that substantially remain the same are indicated in principle with the same reference signs. To differentiate the exemplary embodiments, the letters a to c are added to the reference signs in the exemplary embodiments. The following description is limited substantially to the differences from the first exemplary embodiment described in FIG. 1, wherein reference can be made to the description of the first exemplary embodiment in FIG. 1 with respect to components, features and functions that remain the same. In the exemplary embodiments of FIGS. 2 to 6, the letter a has been replaced by the letters b to f.

Figure 2:
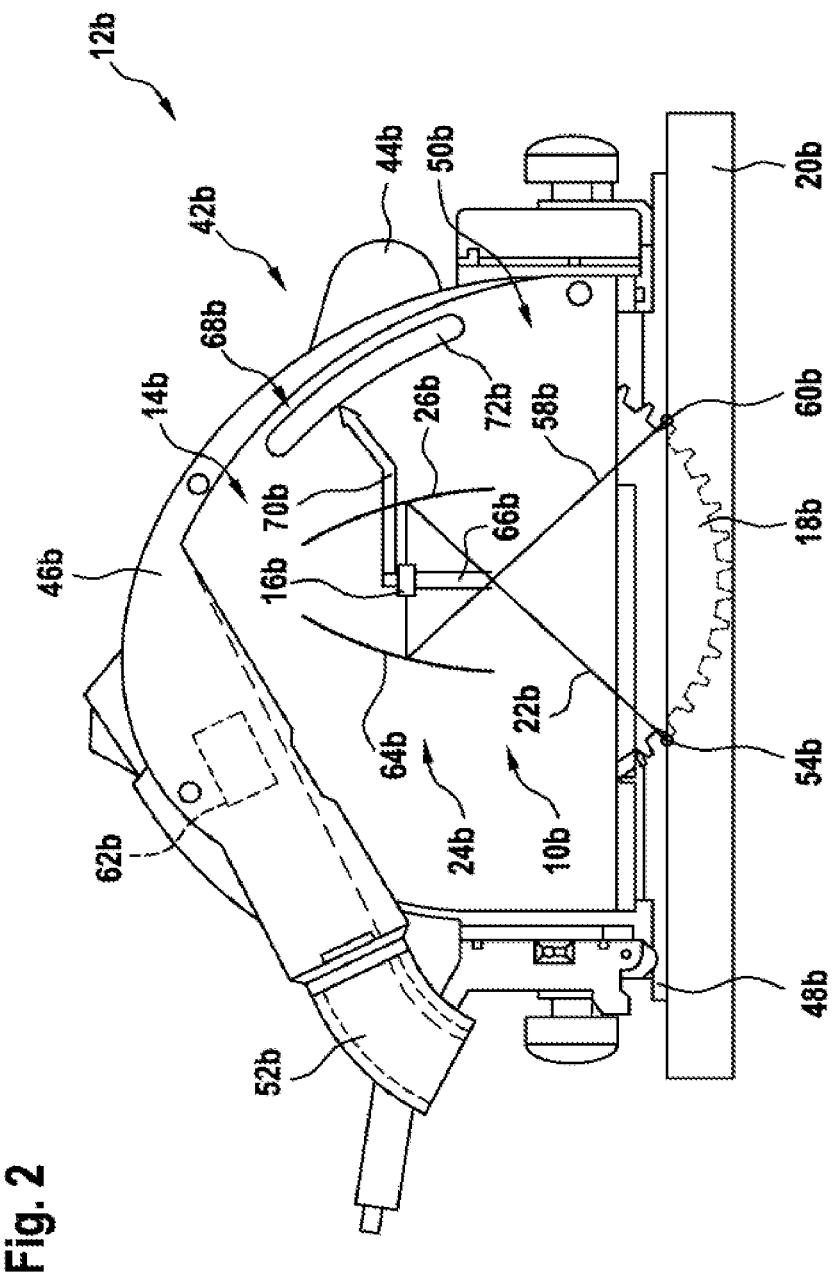
FIG. 2 shows a simplified illustration of a portable power tool having an alternative cutting length display apparatus.

FIG. 2 shows a portable power tool 12b which is configured as a plunge saw and comprises a cutting depth setting unit 42b for setting a cutting depth of a machining tool 18b and an alternative configuration of a cutting length display apparatus 10b.

The cutting length display apparatus 10b has a display unit 14b, which comprises a light source 16b and is provided for displaying at least one position of a cutting edge of the machining tool 18b on a workpiece 20b to be machined in dependence on a set cutting depth of a machining tool 18b using a light beam 22b. The display unit 14a is provided in at least one operating state for displaying at least one position of a further cutting edge of the machining tool 18a using a further light beam 58b. The light source 16b is provided for producing the light beam 22b and the further light beam 58a. The display unit 14b is configured as a laser display unit. The light source 16b is configured as a laser light source. The display unit 14b images in at least one operating state a cutting edge display line 54b, which extends at least substantially transversely to a cutting plane of the machining tool 18a, on the workpiece 20b to be machined using the light beam 22b for displaying the position of the cutting edge. The display unit 14b images in at least one operating state a further cutting edge display line 60b, which extends at least substantially transversely to the cutting plane of the machining tool 18b, on the workpiece 20b to be machined using the further light beam 58b for displaying the position of the further cutting edge.

The display unit 14b has a mirror unit 24b, which is provided for deflecting the light beams 22b, 58b in dependence on the set cutting depth of the machining tool 18b. A relative pose of at least one part of the mirror unit 24b with respect to the light source 16b is changeable for changing a reflection angle. The mirror unit 24b has two concave mirror elements 26b, 64b, which are provided for deflecting the light beams 22b, 58b onto the workpiece 20b. The light source 16b is displaceable along a guide track 66b, extending perpendicularly to a placement unit 48b of the power tool 12b, relative to the concave mirror elements 26a, 64b.

The cutting length display apparatus 10b furthermore comprises a movement coupling unit 68b, which connects the light source 16b to a cutting depth setting element 44b of the cutting depth setting unit 42b in a movement-dependent manner. The light source 16b is connected to a movement coupling element 70b of the movement coupling unit 68b. The cutting depth setting element 44b is mounted movably on a guide track element 72b of the cutting depth setting unit 42b for setting a cutting depth of the machining tool 18b. The guide track element 72b is arranged at the protection unit 50b. In the case of a movement of the cutting depth setting element 44b relative to the guide track element 72b, the movement coupling element 70b is likewise moved, due to the connection to the cutting depth setting element 44b, relative to the guide track element 72b along a profile of the guide track element 72b, as a result of which the light source 16b is displaced along the guide track 66b. The displacement of the light source 16b relative to the concave mirror elements 26b, 64b results in a change in the reflection angle of the light beams 22b, 58b in the direction of the workpiece 20b.

Figure 3:
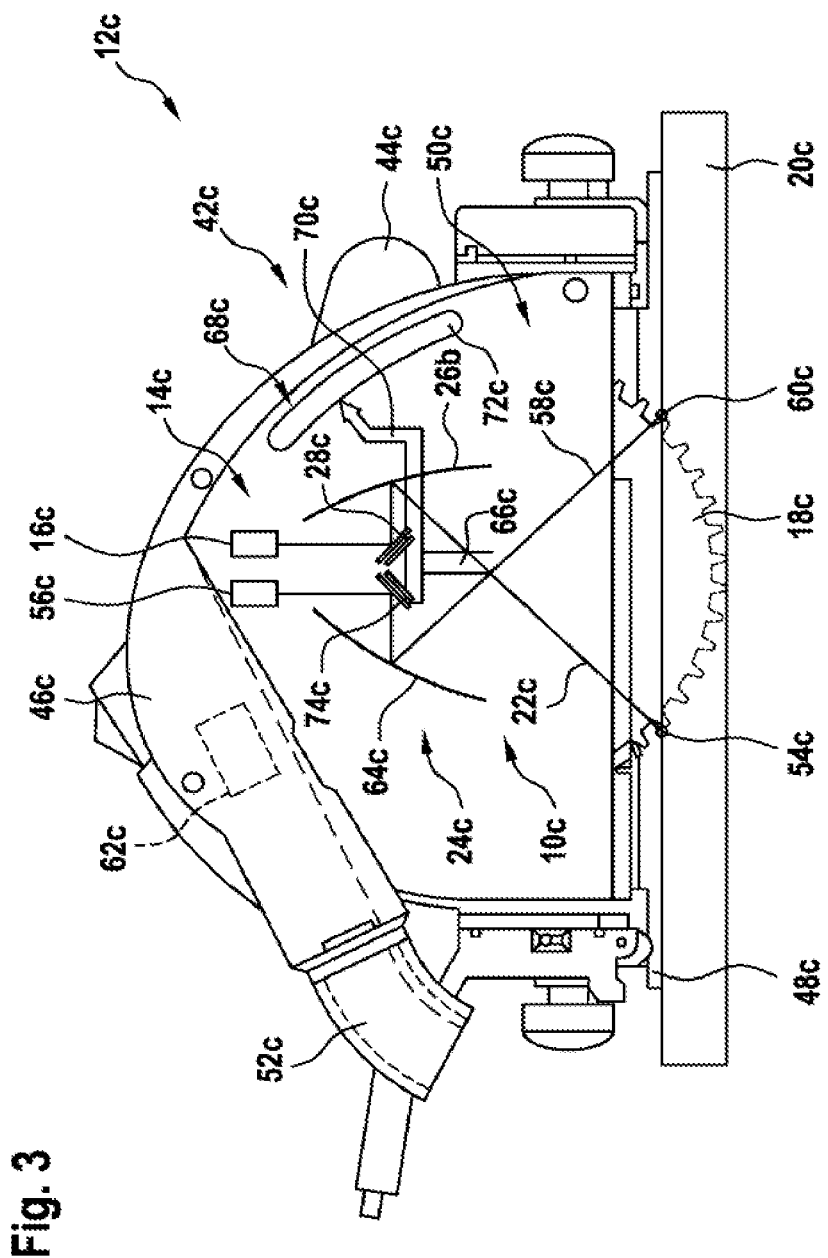
FIG. 3 shows a simplified illustration of a portable power tool having a further alternative cutting length display apparatus.

FIG. 3 shows a portable power tool 12c, which is configured as a plunge saw and comprises a cutting depth setting unit 42c for setting a cutting depth of a machining tool 18c and a further alternative configuration of a cutting length display apparatus 10c.

The cutting length display apparatus 10c has a display unit 14c, which comprises two light sources 16c, 56c and is provided for displaying at least one position of a cutting edge of the machining tool 18c on a workpiece 20c to be machined in dependence on a set cutting depth of a machining tool 18c using light beams 22c, 58c. The light sources 16c, 56c are configured as laser light sources. The display unit 14c images in at least one operating state a cutting edge display line 54c, which extends at least substantially transversely to a cutting plane of the machining tool 18c, on the workpiece 20c to be machined using the light beam 22c for displaying the position of the cutting edge. The display unit 14c images in at least one operating state a further cutting edge display line 60c, which extends at least substantially transversely to the cutting plane of the machining tool 18c, on the workpiece 20c to be machined using the further light beam 58c for displaying the position of the further cutting edge.

The display unit 14c has a mirror unit 24c, which is provided for deflecting the light beams 22c, 58c in dependence on the set cutting depth of the machining tool 18c. A relative pose of at least one part of the mirror unit 24c with respect to the light sources 16c, 56c is changeable for changing a reflection angle. The mirror unit 24c has two concave mirror elements 26c, 64c and two deflecting mirror elements 28c, 74c, which are provided for deflecting the light beams 22c, 58c onto the concave mirror elements 26c, 64c. The concave mirror elements 26b, 64b are provided for deflecting the light beams 22c, 58c onto the workpiece 20c. The deflecting mirror elements 28c, 74c are displaceable along a guide track 66c, extending perpendicularly to a placement unit 48c of the power tool 12c, relative to the concave mirror elements 26c, 64c.

The cutting length display apparatus 10c furthermore comprises a movement coupling unit 68c, which connects the deflecting mirror elements 28c, 74c to the cutting depth setting element 44c of the cutting depth setting unit 42bc in a movement-dependent manner. The deflecting mirror elements 28c, 74c are connected to a movement coupling element 70c of the movement coupling unit 68c. The cutting depth setting element 44c is mounted movably on a guide track element 72c of the cutting depth setting unit 42c for setting a cutting depth of the machining tool 18c. The guide track element 72c is arranged at the protection unit 50c. In the case of a movement of the cutting depth setting element 44c relative to the guide track element 72c, the movement coupling element 70c is likewise moved, due to the connection to the cutting depth setting element 44c, relative to the guide track element 72c along a profile of the guide track element 72c, as a result of which the deflecting mirror elements 28c, 74c are displaced along the guide track 66c. The displacement of the deflecting mirror elements 28c, 74c relative to the concave mirror elements 26c, 64c results in a change in the reflection angle of the light beams 22c, 58c in the direction of the workpiece 20c.

Figure 4:
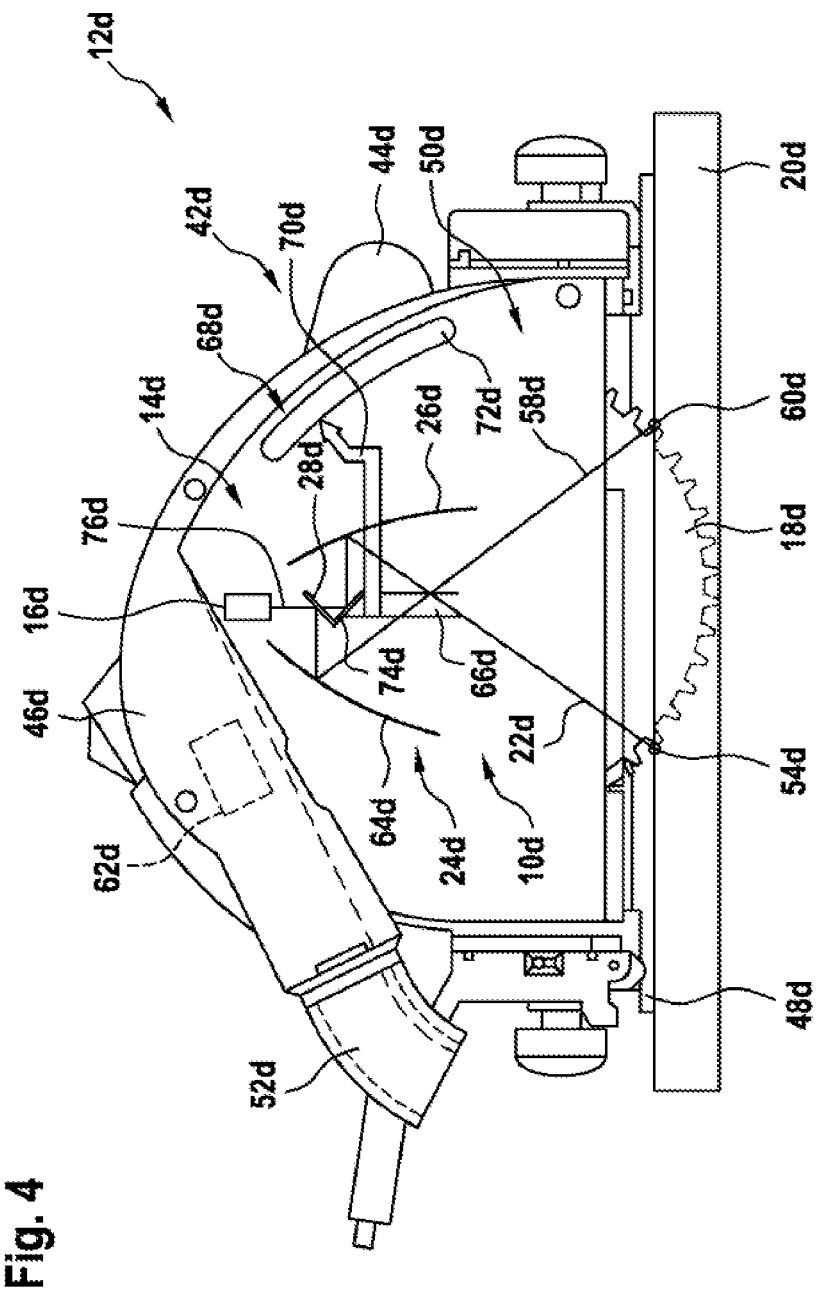
FIG. 4 shows a simplified illustration of a portable power tool having a further alternative cutting length display apparatus.

FIG. 4 shows a portable power tool 12d which is configured as a plunge saw and comprises a cutting depth setting unit 42d for setting a cutting depth of a machining tool 18d and a further alternative configuration of a cutting length display apparatus 10d.

The cutting length display apparatus 10d has a display unit 14d, which comprises a light source 16d and is provided for displaying at least one position of a cutting edge of the machining tool 18d on a workpiece 20d to be machined in dependence on a set cutting depth of a machining tool 18d using light beams 22d, 58d. The light source 16d is configured as a laser light source. The display unit 14d images in at least one operating state a cutting edge display line 54d, which extends at least substantially transversely to a cutting plane of the machining tool 18d, on the workpiece 20d to be machined using the light beam 22d for displaying the position of the cutting edge. The display unit 14d images in at least one operating state a further cutting edge display line 60d, which extends at least substantially transversely to the cutting plane of the machining tool 18d, on the workpiece 20d to be machined using the further light beam 58d for displaying the position of the further cutting edge.

The display unit 14d has a mirror unit 24d, which is provided for deflecting the light beams 22d, 58d in dependence on the set cutting depth of the machining tool 18d. A relative pose of at least one part of the mirror unit 24d with respect to the light sources 16c, 56c is changeable for changing a reflection angle. The mirror unit 24d has two concave mirror elements 26d, 64d and two deflecting mirror elements 28d, 74d. The deflecting mirror elements 28d, 74d are provided for splitting a light beam 76d coming from the light source 16d into the light beams 22d, 58d and for deflecting the light beams 22d, 58d onto the concave mirror elements 26d, 64d. A first deflecting mirror element 28d has a semi-transmissive configuration, such that the light beam 22d passes through the first deflecting mirror element 28d, while the light beam 58d is deflected onto the concave mirror element 64d. The light beam 22d is deflected by the second deflecting mirror element 74d onto the concave mirror element 26d. The concave mirror elements 26d, 64d are provided for deflecting the light beams 22d, 58d onto the workpiece 20d. The deflecting mirror elements 28d, 74d are displaceable along a guide track 66d, extending perpendicularly to a placement unit 48d of the power tool 12d, relative to the concave mirror elements 26d, 64d.

The cutting length display apparatus 10d furthermore comprises a movement coupling unit 68d, which connects the deflecting mirror elements 28d, 74d to the cutting depth setting element 44d of the cutting depth setting unit 42d in a movement-dependent manner. The deflecting mirror elements 28d, 74d are connected to a movement coupling element 70d of the movement coupling unit 68d. The cutting depth setting element 44d is mounted movably on a guide track element 72d of the cutting depth setting unit 42d for setting a cutting depth of the machining tool 18d. The guide track element 72d is arranged at the protection unit 50d. In the case of a movement of the cutting depth setting element 44d relative to the guide track element 72d, the movement coupling element 70d is likewise moved, due to the connection to the cutting depth setting element 44d, relative to the guide track element 72d along a profile of the guide track element 72d, as a result of which the deflecting mirror elements 28d, 74d are displaced along the guide track 66d. The displacement of the deflecting mirror elements 28d, 74d relative to the concave mirror elements 26d, 64d results in a change in the reflection angle of the light beams 22d, 58d in the direction of the workpiece 20d.

Figure 5:
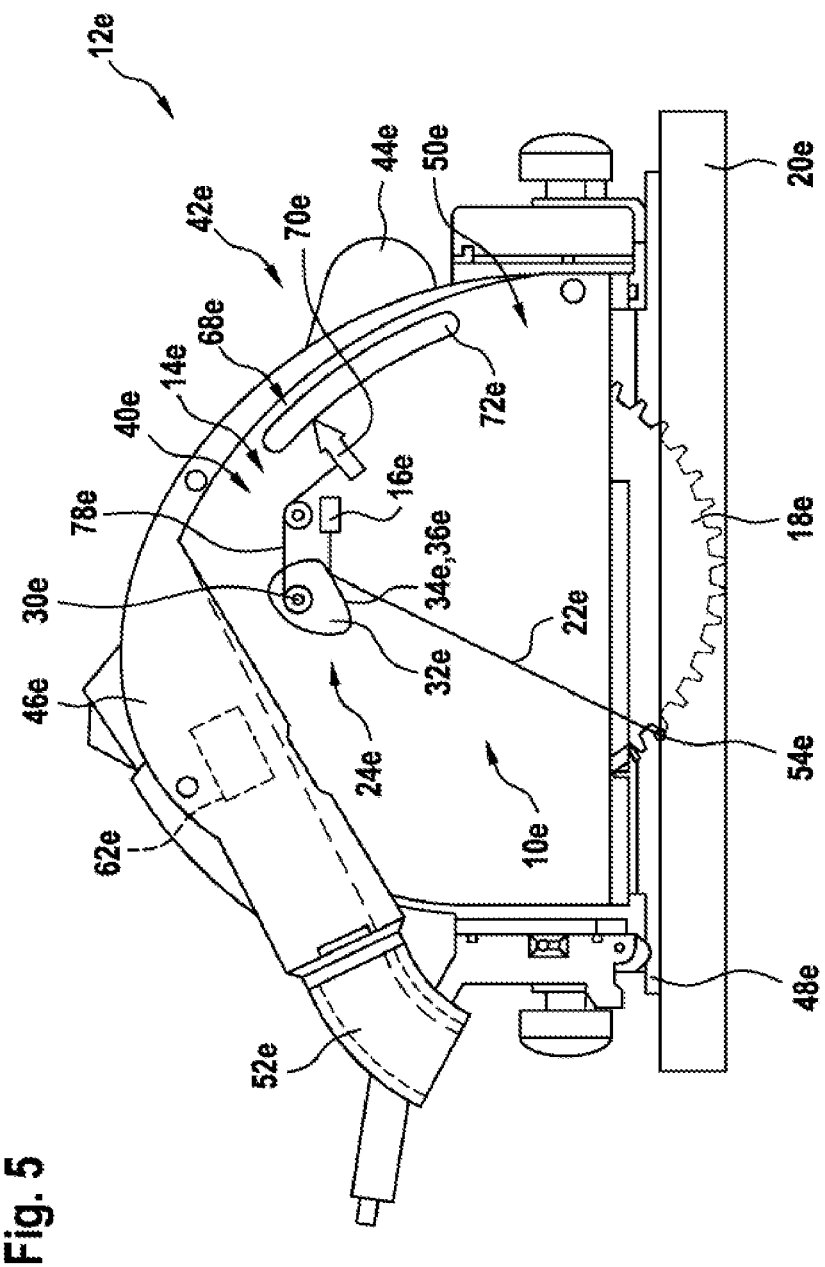
FIG. 5 shows a simplified illustration of a portable power tool having a further alternative cutting length display apparatus.

FIG. 5 shows a portable power tool 12e which is configured as a plunge saw and comprises a cutting depth setting unit 42e for setting a cutting depth of a machining tool 18e and a further alternative configuration of a cutting length display apparatus 10e.

The cutting length display apparatus 10e has a display unit 14e, which comprises a light source 16e and is provided for displaying at least one position of a cutting edge of the machining tool 18e on a workpiece 20e to be machined in dependence on a set cutting depth of a machining tool 18e using a light beam 22d. The light source 16e is configured as a laser light source. The display unit 14e images in at least one operating state a cutting edge display line 54e, which extends at least substantially transversely to a cutting plane of the machining tool 18e, on the workpiece 20e to be machined using the light beam 22e for displaying the position of the cutting edge.

The display unit 14e has a mirror unit 24e, which is provided for deflecting the light beam 22e in dependence on the set cutting depth of the machining tool 18d. A relative pose of at least one part of the mirror unit 24e with respect to the light source 16e is changeable for changing a reflection angle. The mirror unit 24e has a mirror element 32e, which is mounted rotatably about an axis of rotation 30e and is provided for deflecting the light beam 22e onto the workpiece 20e. The mirror element 32e has, on an outer contour 34e, a convexly curved mirror surface 36e. The mirror unit 24e furthermore has a cable system 40e, which is provided for inducing a rotational movement of the mirror element 32e in dependence on the set cutting depth of the machining tool 18e.

The cutting length display apparatus 10e furthermore comprises a movement coupling unit 68e, which connects the mirror element 32e to the cutting depth setting element 44e of the cutting depth setting unit 42e in a movement-dependent manner. The cable system 40e is connected to a movement coupling element 70e of the movement coupling unit 68e. The cutting depth setting element 44e is mounted movably on a guide track element 72e of the cutting depth setting unit 42e for setting a cutting depth of the machining tool 18e. The guide track element 72e is arranged at the protection unit 50e. In the case of a movement of the cutting depth setting element 44e relative to the guide track element 72e, the movement coupling element 70e is likewise moved, due to the connection to the cutting depth setting element 44e, relative to the guide track element 72e along a profile of the guide track element 72e, which results in a movement of a pull cable 78e of the cable system 40e. The movement of the pull cable 78e induces a rotational movement of the mirror element 32e and, as a result thereof, a change in the reflection angle of the light beam 22e in the direction of the workpiece 20e.

Figure 6:
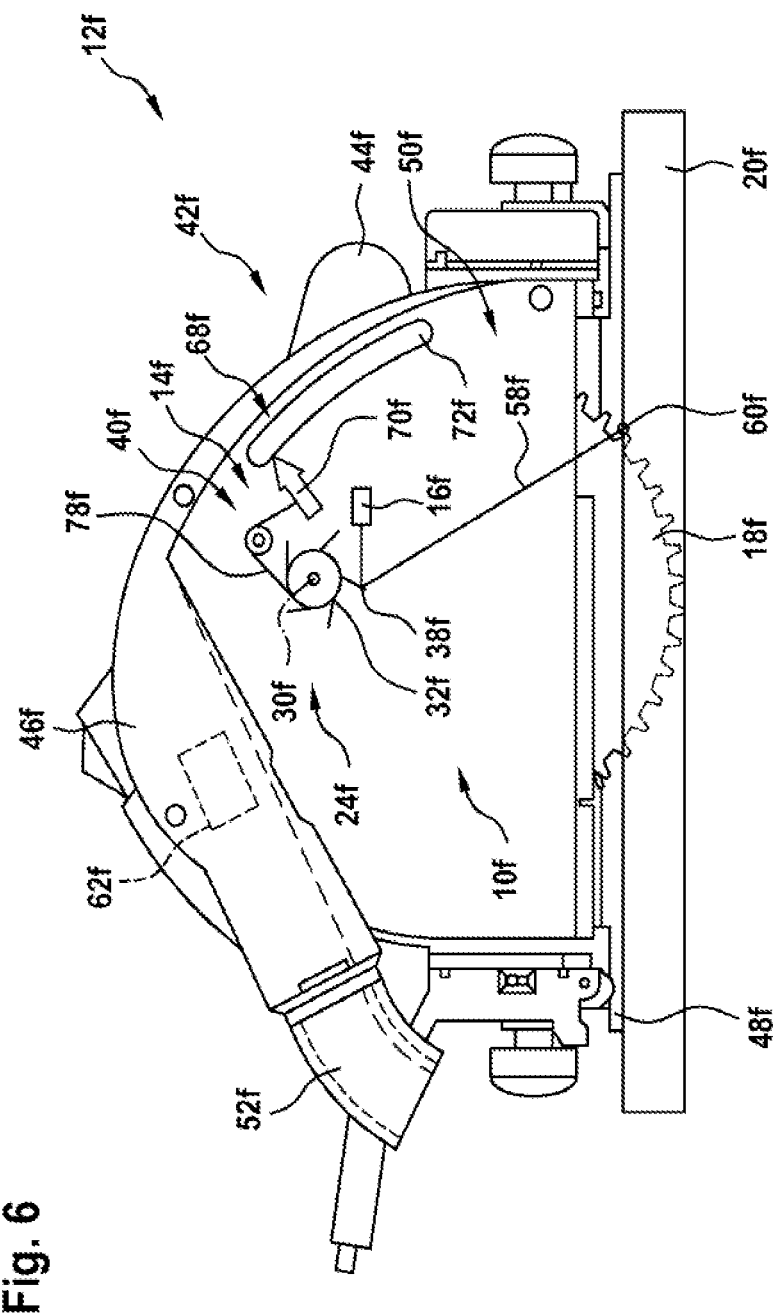
FIG. 6 shows a simplified illustration of a portable power tool having a further alternative cutting length display apparatus.

FIG. 6 shows a portable power tool 12*f* which is configured as a plunge saw and comprises a cutting depth setting unit 42*f* for setting a cutting depth of a machining tool 18*f* and a further alternative configuration of a cutting length display apparatus 10*f*.

The cutting length display apparatus 10*f* has a display unit 14*f*, which comprises a light source 16*f* and is provided for displaying at least one position of a cutting edge of the machining tool 18*f* on a workpiece 20*f* to be machined in dependence on a set cutting depth of a machining tool 18*f* using a light beam 58*f*. The light source 16*f* is configured as a laser light source. The display unit 14*f* images in at least one operating state a cutting edge display line 60*f*, which extends at least substantially transversely to a cutting plane of the machining tool 18*f*, on the workpiece 20*f* to be machined using the light beam 58*f* for displaying the position of the cutting edge.

The display unit 14*f* has a mirror unit 24*f*, which is provided for deflecting the light beam 58*f* in dependence on the set cutting depth of the machining tool 18*f*. A relative pose of at least one part of the mirror unit 24*f* with respect to the light source 16*f* is changeable for changing a reflection angle. The mirror unit 24*f* has a mirror element 32*f*, which is mounted rotatably about an axis of rotation 30*f* and is provided for deflecting the light beam 22*f* onto the workpiece 20*f*. The mirror element 32*e* has a plurality of planar mirror surfaces 38*f*, which are arranged at the mirror element 32*f* in the circumferential direction. The mirror unit 24*f* furthermore has a cable system 40*f*, which is provided for inducing a rotational movement of the mirror element 32*f* in dependence on the set cutting depth of the machining tool 18*f*.

The cutting length display apparatus 10*f* furthermore comprises a movement coupling unit 68*f*, which connects the mirror element 32*f* to the cutting depth setting element 44*f* of the cutting depth setting unit 42*f* in a movement-dependent manner. The cable system 40*f* is connected to a movement coupling element 70*f* of the movement coupling unit 68*f*. The cutting depth setting element 44*f* is mounted movably on a guide track element 72*f* of the cutting depth setting unit 42*f* for setting a cutting depth of the machining tool 18*f*. The guide track element 72*f* is arranged at the protection unit 50*f*. In the case of a movement of the cutting depth setting element 44*f* relative to the guide track element 72*f*, the movement coupling element 70*f* is likewise moved, due to the connection to the cutting depth setting element 44*f*, relative to the guide track element 72*f* along a profile of the guide track element 72*f*, which results in a movement of a pull cable 78*f* of the cable system 40*f*. The movement of the pull cable 78*f* induces a rotational movement of the mirror element 32*f* and, as a result thereof, a change in the reflection angle of the light beam 22*f* in the direction of the workpiece 20*f*.

The invention claimed is:

1. A cutting length display apparatus for a portable power tool, the portable power tool having a machining tool, the machining tool having a set cutting depth that is adjustable, the cutting length display apparatus comprising: at least one display unit having (i) at least one light source configured to emit a light beam and (ii) a mirror unit configured to deflect the light beam onto a workpiece to be machined based on the set cutting depth of the machining tool, the at least one display unit configured to display, with the light beam after deflection by the mirror unit, at least one position indicative of a cutting edge of the machining tool at the set cutting depth, wherein the mirror unit has at least one mirror element configured to rotate in a movement-dependent manner about an axis of rotation as the set cutting depth is adjusted such that the mirror element deflects the light beam at the at least one position, wherein the mirror unit has at least one cable system that is configured to induce a rotational movement of the at least one mirror element based on the set cutting depth of the machining tool, the rotational movement being less than one revolution of the at least one mirror element about the axis of rotation.

2. The cutting length display apparatus as claimed in claim 1, wherein a relative pose of at least one part of the mirror unit with respect to the light source is changeable to change at least one reflection angle.

3. The cutting length display apparatus as claimed in claim 1, wherein the at least one mirror element comprises at least one concave mirror element.

4. The cutting length display apparatus as claimed in claim 1, wherein the at least one mirror element comprises at least one concave mirror element and at least one deflecting mirror element that is configured to deflect the light beam onto the concave mirror.

5. The cutting length display apparatus as claimed in claim 4, wherein the at least one deflecting mirror element is displaceable relative to the concave mirror element to change at least one reflection angle.

6. The cutting length display apparatus as claimed in claim 1, wherein the at least one mirror element has at least one convexly curved mirror surface on an outer contour.

7. The cutting length display apparatus as claimed in claim 1, wherein the at least one mirror element has a plurality of planar mirror surfaces that are arranged on the at least one mirror element in a circumferential direction.

8. A power tool, comprising:
a cutting depth setting unit configured to adjust a set cutting depth of a machining tool; and
at least one cutting length display apparatus that includes at least one display unit, the at least on display unit having:
at least one light source configured to emit a light beam, and
a mirror unit configured to deflect the light beam onto a workpiece to be machined based on the set cutting depth of the machining tool, the at least one display unit configured to display, with the light beam after deflection by the mirror unit, at least one position indicative of a cutting edge of the machining tool at the set cutting depth,
wherein the mirror unit has at least one mirror element that is configured to rotate about an axis of rotation, the mirror unit operatively coupled to the cutting depth setting unit in a movement-dependent manner such that a movement of the cutting depth setting unit simultaneously rotates the at least one mirror element such that the at least one mirror element deflects the light beam at the at least one position.

9. The power tool as claimed in claim 8, wherein the power tool is configured as a portable power tool.

10. The cutting length display apparatus as claimed in claim 1, wherein the light beam has an angle of incidence on the mirror unit that changes based on the set cutting depth of the machining tool.

11. The power tool as claimed in claim 8, wherein the light beam has a reflection angle on the mirror unit that changes based on the set cutting depth of the machining tool.

12. The power tool as claimed in claim 11, wherein a movement of the cutting depth setting element relative to the power tool causes a change in the reflection angle of the light beam in a direction of the workpiece.

13. A cutting length display apparatus for a portable power tool, the portable power tool having a machining tool, the machining tool having an adjustable set cutting depth, comprising:
 a display unit having a light source configured to emit a light beam and a mirror unit configured to deflect the light beam based on the set cutting depth of the machining tool such that the light beam intersects a reference plane at a position indicative of a cutting edge of the machining tool at the set cutting depth, the reference plane corresponding to a surface of a workpiece configured to be machined by the machining tool at the set cutting depth,
 wherein the mirror unit has at least one mirror element configured to rotate in a movement-dependent manner about an axis of rotation as the set cutting depth is adjusted such that the at least one mirror element deflects the light beam so as to intersect the reference plane at the position.

14. The cutting length display apparatus as claimed in claim 1, wherein the at least one position corresponds to an exit point or an entry point of the cutting edge from or into the workpiece on a workpiece surface of the workpiece, at which the machining tool, upon reaching the set cutting depth is configured to exit from the workpiece or enter the workpiece in a manner decoupled from a displacement movement of the portable power tool on the workpiece surface of the workpiece.

15. The cutting length display apparatus as claimed in claim 1, wherein the axis of rotation is in a plane perpendicular to a light beam axis of the light beam.

16. The cutting length display apparatus as claimed in claim 1, further comprising:
 a movement coupling unit configured to connect the at least one mirror element with a cutting depth setting unit of the portable power tool such that the at least one light source is fixedly positioned with respect to a guide track element of the cutting depth setting unit.

17. The cutting length display apparatus as claimed in claim 1, further comprising:
 a movement coupling unit configured to connect the at least one mirror element with a cutting depth setting unit of the portable power tool, such that the axis of rotation is fixedly positioned with respect to a guide track element of the cutting depth setting unit.

18. The power tool as claimed in claim 8, wherein:
 the cutting depth setting unit comprises a guide track element; and
 the at least one cutting length display apparatus includes a movement coupling unit configured to fixedly position the axis of rotation with respect to the guide track element, and to connect the at least one mirror element to the cutting depth setting unit.

19. The cutting length display apparatus as claimed in claim 13, wherein the axis of rotation is fixedly positioned with respect to a guide track element of a movement coupling unit which connects the at least one mirror element to a cutting depth setting unit.

* * * * *